(12) United States Patent
Davalos et al.

(10) Patent No.: US 9,533,772 B2
(45) Date of Patent: Jan. 3, 2017

(54) VISUAL SEARCH ASSISTANCE FOR AN OCCUPANT OF A VEHICLE

(71) Applicant: HONEYWELL INTERNATIONAL INC., Morristown, NJ (US)

(72) Inventors: Pedro Davalos, Plymouth, MN (US); Robert E. De Mers, Nowthen, MN (US); John F. L. Schmidt, Phoenix, AZ (US); Mohammed Ibrahim Mohideen, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 19 days.

(21) Appl. No.: 14/326,692

(22) Filed: Jul. 9, 2014

(65) Prior Publication Data
US 2016/0009411 A1 Jan. 14, 2016

(51) Int. Cl.
| | | |
|---|---|---|
| *G06F 3/01* | (2006.01) | |
| *B64D 47/02* | (2006.01) | |
| *G06F 3/16* | (2006.01) | |
| *G08G 5/00* | (2006.01) | |
| *B60W 50/14* | (2012.01) | |
| *G06K 9/00* | (2006.01) | |

(52) U.S. Cl.
CPC ............ *B64D 47/02* (2013.01); *B60W 50/14* (2013.01); *G06F 3/012* (2013.01); *G06F 3/013* (2013.01); *G06F 3/016* (2013.01); *G06F 3/167* (2013.01); *G06K 9/00805* (2013.01); *G08G 5/0021* (2013.01); *G08G 5/0052* (2013.01); *G08G 5/0078* (2013.01); *G08G 5/0082* (2013.01)

(58) Field of Classification Search
CPC .................................. G06F 3/012; G06F 3/013
See application file for complete search history.

(56) References Cited

U.S. PATENT DOCUMENTS

| | | | |
|---|---|---|---|
| 6,348,877 | B1 | 2/2002 | Berstis et al. |
| 6,480,763 | B1 | 11/2002 | Lappos |
| 7,737,867 | B2 | 6/2010 | Arthur et al. |

(Continued)

FOREIGN PATENT DOCUMENTS

EP 1369670 A1 12/2003

OTHER PUBLICATIONS

Hainich, R.R.; A Novel Approach to Augmented Reality; The End of Hardware; 2006.

(Continued)

*Primary Examiner* — Alexander Eisen
*Assistant Examiner* — Cory Almeida
(74) *Attorney, Agent, or Firm* — Lorenz & Kopf, LLP (57) ABSTRACT

A visual search assistance system and related operating method are disclosed. An exemplary embodiment of the method dynamically determines a desired line-of-sight vector from an occupant of a vehicle to a visual target, and dynamically determines, with an onboard tracking system of the vehicle, an actual line-of-sight vector for the occupant of the vehicle. The actual line-of-sight vector is temporally associated with the desired line-of-sight vector. The method compares the actual line-of-sight vector against the desired line-of-sight vector to obtain a difference measurement, and generates a notification when the obtained difference measurement exceeds a threshold value. The notification provides guidance to redirect a gaze direction of the occupant toward the visual target.

18 Claims, 4 Drawing Sheets

(56) References Cited

U.S. PATENT DOCUMENTS

| | | | |
|---|---|---|---|
| 8,218,006 B2 | 7/2012 | De Mers et al. | |
| 8,416,152 B2 | 4/2013 | Larson et al. | |
| 8,487,787 B2 | 7/2013 | Best et al. | |
| 8,510,166 B2 | 8/2013 | Neven | |
| 8,898,496 B1* | 11/2014 | Chi | G06F 1/3206 455/574 |
| 2002/0140562 A1 | 10/2002 | Gutta et al. | |
| 2006/0007396 A1* | 1/2006 | Clement | G06F 3/013 351/209 |
| 2008/0266394 A1* | 10/2008 | Groenenboom | G08B 13/196 348/143 |
| 2009/0022368 A1* | 1/2009 | Matsuoka | B60K 35/00 382/103 |
| 2011/0199202 A1 | 8/2011 | De Mers et al. | |
| 2012/0044365 A1* | 2/2012 | Shuster | G02B 27/017 348/207.1 |
| 2013/0286163 A1 | 10/2013 | Dror et al. | |

OTHER PUBLICATIONS

EP Extended Search Report for Application No. EP 15172203.0 Dated Mar. 18, 2016.

* cited by examiner

VISUAL SEARCH ASSISTANCE FOR AN OCCUPANT OF A VEHICLE

TECHNICAL FIELD

Embodiments of the subject matter described herein relate generally to vehicle systems and subsystems. More particularly, embodiments of the subject matter relate to an aircraft crew alerting and visual guidance system.

BACKGROUND

Instrumentation, display, and alerting systems for vehicles are generally known. Such systems are particularly important for safe operation of vehicles such as aircraft, spacecraft, and watercraft. In an aircraft context, for example, pilots must maintain situational awareness of the environment both inside and outside the cockpit. External situational awareness is important for purposes of identifying neighboring aircraft traffic, visually identifying landmarks, locating airports, determining weather patterns, and the like. Situational awareness inside the cockpit is also important for purposes of identifying and reading displays, instrumentation, alerts, and the like.

Visually locating neighboring aircraft in flight can be challenging due to the cluttered ground background, sunlight or other lighting conditions, weather, and the large three-dimensional viewspace that is typically involved. Challenges for locating ground-based landmarks such as airports are similar, especially when the pilot is operating in new or unfamiliar areas. Likewise, it may be difficult for a pilot to quickly and easily identify and view a display element, alert message, indicator light, or other element inside the cockpit that requires attention. Visually identifying a specific item within an aircraft cockpit can be particularly challenging when the cockpit contains a large amount of instrumentation, controls, switches, displays, and indicator lights.

Accordingly, it is desirable to have an effective, accurate, and practical solution to assist an operator or occupant of a vehicle (such as an aircraft) in visually finding and identifying objects that may be inside the vehicle or outside the vehicle. In addition, it is desirable to have a system onboard a vehicle that alerts an occupant of the vehicle when necessary to direct the attention of the occupant to a visual target. Furthermore, other desirable features and characteristics will become apparent from the subsequent detailed description and the appended claims, taken in conjunction with the accompanying drawings and the foregoing technical field and background.

BRIEF SUMMARY

A visual search assistance method for an occupant of a vehicle is disclosed herein. An exemplary embodiment of the method dynamically determines a desired line-of-sight vector from an occupant of the vehicle to a visual target, and dynamically determines, with an onboard tracking system of the vehicle, an actual line-of-sight vector for the occupant of the vehicle. The actual line-of-sight vector is temporally associated with the determined desired line-of-sight vector. The method continues by comparing the determined actual line-of-sight vector against the determined desired line-of-sight vector to obtain a difference measurement. A notification is generated when the obtained difference measurement exceeds a threshold value. The notification provides guidance to redirect a gaze direction of the occupant toward the visual target.

Also disclosed is a tangible and non-transitory computer readable medium having computer executable instructions stored thereon and capable of performing a method when executed by a processor. An exemplary embodiment of the method dynamically obtains a desired line-of-sight vector from an occupant of an aircraft to a visual target, and dynamically obtains, from an onboard tracking system of the aircraft, an actual line-of-sight vector for the occupant of the aircraft. The actual line-of-sight vector is temporally associated with the determined desired line-of-sight vector. The actual line-of-sight vector is compared against the desired line-of-sight vector to obtain a difference measurement. The method continues by generating a notification when the obtained difference measurement exceeds a threshold value, the notification providing guidance to redirect a gaze direction of the occupant toward the visual target.

A computing system for a vehicle is also presented herein. An exemplary embodiment of the computing system includes a processor architecture having at least one processor device, and memory having computer-executable instructions stored thereon. When the instructions are executed by the processor architecture, the computing system operates an onboard tracking system of the vehicle to dynamically obtain a current line-of-sight vector for an occupant of the vehicle. The computing system compares the current line-of-sight vector against a current desired line-of-sight vector from the occupant of the vehicle to a visual target, wherein the current line-of-sight vector is temporally associated with the current desired line-of-sight vector. The computing system provides information when the difference measurement exceeds a threshold value. The information is intended for the occupant of the vehicle, and the information provides guidance to redirect a gaze direction of the occupant toward the visual target.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, processor-executed, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or executable instructions that, when executed by one or more processor devices, cause the host computing system to perform the various tasks. In certain embodiments, the program or code segments are stored in a tangible processor-readable medium, which may include any medium that can store or transfer information. Examples of suitable forms of non-transitory and processor-readable media include an electronic circuit, a semiconductor memory device, a ROM, a flash memory, an erasable ROM (EROM), a floppy diskette, a CD-ROM, an optical disk, a hard disk, or the like.

The techniques and technologies described here can be deployed with any vehicle, including, without limitation: aircraft; watercraft; road vehicles such as cars, buses, trucks, and motorcycles; spacecraft; trains; subways; specialty equipment (e.g., construction equipment, factory equipment, etc.); trams; and the like. The particular embodiments described below relate to aircraft applications, however, the subject matter is not limited or restricted to such aircraft applications.

As aircraft become more complex, it is important to keep the flight crew attentive and informed in a timely manner regarding air traffic, alerts, and the like. For example, it is beneficial for a pilot to know the positioning of other aircraft during flight, and to know the layout and location of taxiways and runways during landing and takeoff maneuvers. The embodiments presented here leverage an onboard tracking system that uses onboard sensors and related processing techniques to determine the gaze direction of an occupant of the aircraft, typically the pilot or co-pilot. As used here, "occupant" is intended to include any person onboard the vehicle. Thus, an occupant may be, without limitation: a pilot; a co-pilot; a driver; an operator; a crew member; a passenger; a technician; a user; an observer; etc.

In accordance with certain embodiments, the onboard tracking system includes, cooperates with, or is realized using a near-to-eye (NTE) display system. NTE display has been touted as an effective and inexpensive means of presenting navigation and safety information, and as a replacement for traditional head-up display technologies. NTE display systems use sensors (e.g., infrared light emitting diodes, cameras, or the like) to sense the user's head position and orientation for purposes of presenting appropriate information on the NTE display element. Outside their use in the NTE system, these sensors can be used to collect detailed information about the pilot's state and actions. In certain situations, a crew member may not be fully attentive to important or critical events in the surrounding environment, such as the presence of neighboring aircraft in the vicinity of the host aircraft. In such situations, the direction of the person's eye gaze may be different than the desired direction toward a visual target of interest.

Moreover, during flight operations, crew members onboard an aircraft receive information such as traffic advisories, terrain warnings, system status information, and alerts. An occupant of the aircraft may be expected to quickly view and comprehend information provided during flight. The system and methodology described here keeps track of received information that might require visual attention, and calculates or obtains the expected or desired line-of-sight direction from the crew member to the visual target. This real-time status information is correlated with the crew member's actual view state, as obtained from the NTE system, to determine any variation between the desired and actual direction of visual attention. In addition, when the occupant's actual eye gaze direction deviates from the desired direction toward the visual target, the onboard system generates an alert (e.g., a visual indicator) that identifies the desired direction of visual attention.

For example, Traffic Advisories (TAs) are issued to facilitate visual acquisition of air traffic in the vicinity of the host aircraft. Pilots are expected to visually acquire the air traffic and prepare for a Resolution Advisory (RA). The system described here can compare the pilot's actual viewing direction against a viewing direction associated with an aircraft identified by a TA and generate an alert when it is determined that the pilot is not looking in the appropriate direction. If necessary, a visual indicator pointing to the desired visual target (such as directional arrow, a chevron, or the like) can be rendered using the NTE system and/or other display systems onboard the aircraft.

In accordance with certain embodiments, the visual search assistance system employs an eye gaze tracking system and known position information for both the observer and the visual target object. In this regard, the visual assistance system may leverage global positioning system (GPS) data that refers to one point in three-dimensional space for each object. The GPS data can be processed to provide a directional vector from the observer to the visual target. The eye gaze tracking system provides a directional vector corresponding to the current gaze direction of the observer, and the system compares the two directional vectors to provide feedback to the observer to adjust his or her current gaze direction as needed to find the desired visual target. In practice, visual targets may be, without limitation, gauges, panels, circuit breakers, or switches that may be visually obstructed. The pilot can then query the search assistance system through voice activation and receive audible feedback to correct the eye gaze direction.

Conversely, the pilot may query the system for assistance in identifying an object seen by the pilot. For example, the pilot may see an unfamiliar airport on the ground, and may want to know the name of the airport. By comparing the directional vector of the pilot's eye gaze to the nearest known airport intersecting the ground plane with the gaze vector, the system can determine the name of the airport and communicate the name to the pilot.

This particular embodiment may include an eye gaze tracking subsystem mounted in the flight deck and/or a NTE subsystem such as glasses or goggles worn by the pilot. The eye tracking subsystem (after calibration) provides a directional vector for the occupant's gaze relative to the aircraft. The visual assistance system may also leverage a GPS receiver that provides information related to the pilot's position (latitude, longitude, and elevation), as well as time and heading information that can be used to estimate the directional vector from the aircraft to the searched visual target. This directional vector can provide an angle difference, relative to the visual target, in real-time. The assistance system may also include a speech synthesizer that can enunciate the magnitude and direction of the angle difference to the pilot such that the gaze can be corrected to reduce the gaze vector error and such that the pilot can quickly and intuitively locate the visual target of interest.

Figure 1:
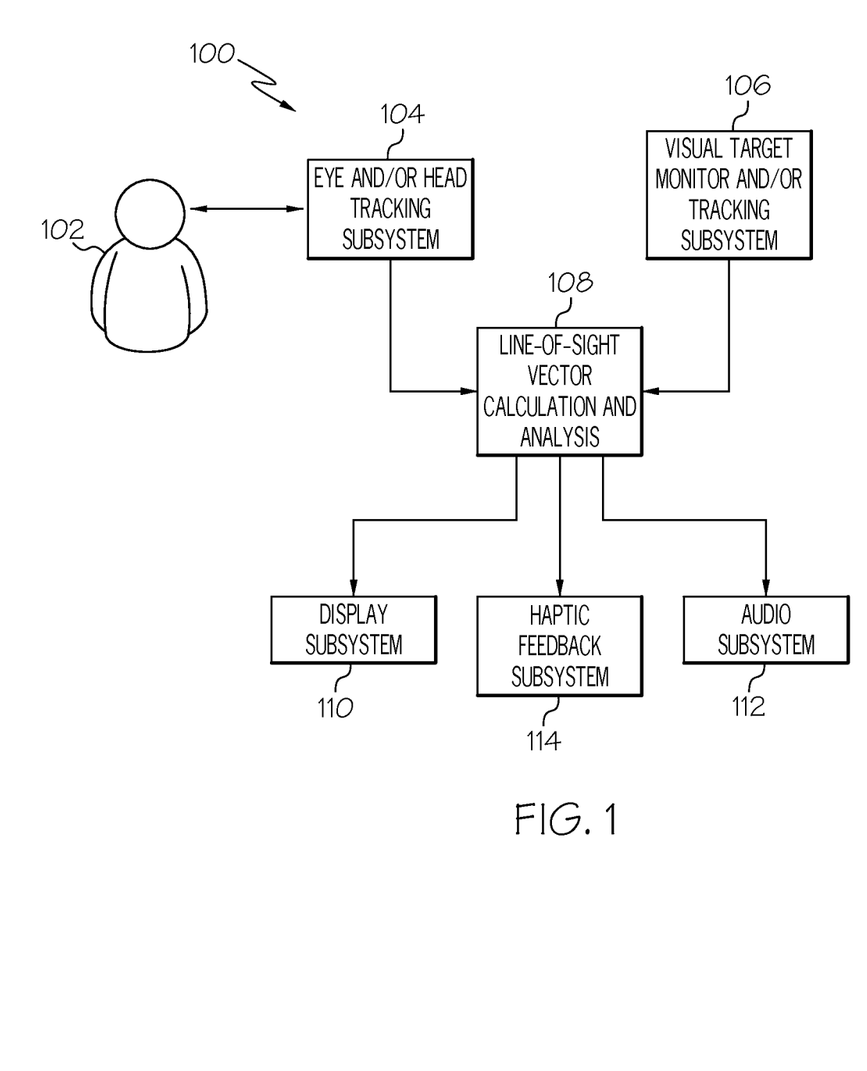
FIG. 1 is a simplified schematic representation of an exemplary embodiment of an onboard system that provides visual search assistance to an occupant or operator of a vehicle.

Referring now to the drawings, FIG. 1 is a simplified schematic representation of an exemplary embodiment of an onboard system 100 that provides visual search assistance to an occupant 102 of a vehicle such as an aircraft. FIG. 1 depicts various onboard aircraft subsystems that cooperate to provide visual assistance and guidance to the occupant 102 (e.g., the pilot, the co-pilot, a crew member, or any observer onboard the aircraft). This embodiment of the system 100 generally includes, without limitation: an eye and/or head tracking subsystem 104; a visual target monitor and/or tracking subsystem 106; a line-of-sight vector calculation and analysis module 108; a display subsystem 110; an audio subsystem 112; and a haptic feedback subsystem 114.

The eye and/or head tracking subsystem 104 includes the appropriate hardware, software, firmware, sensors, and processing logic to continuously track the eye gaze direction or head position and orientation of the occupant 102 in real-time during operation of the vehicle. In certain embodiments, the tracking subsystem 104 includes or cooperates with eye tracking technology that determines the current and actual line-of-sight direction (vector) of the occupant 102. In layman's terms, eye tracking technology can be utilized by the tracking subsystem to monitor where the occupant 102 is looking at any given moment. The system 100 may utilize any suitably configured eye tracking subsystem 104, whether currently available or developed in the future. In practice, an appropriate eye tracking subsystem 104 may use video technology, graphics processing, on-eye technology, head-worn display system technology, NTE display system technology, or the like.

In some embodiments, the tracking subsystem 104 includes or cooperates with head tracking or facial recognition technology that determines the current and actual line-of-sight direction of the occupant 102 based on head or face position, orientation, etc. The system 100 may utilize any suitably configured head tracking subsystem 104, whether currently available or developed in the future. In practice, an appropriate head tracking subsystem 104 may use video technology, graphics processing, on-eye technology, head-worn display system technology, NTE display system technology, or the like. Depending on the particular embodiment, the system 100 may leverage both a head tracking subsystem and an eye tracking subsystem if so desired.

The visual target monitor and/or tracking subsystem 106 includes the appropriate hardware, software, firmware, sensors, and processing logic to continuously receive, calculate, determine, or otherwise obtain data associated with a visual target of interest. As used here, a visual target may be something onboard the vehicle or something external to the vehicle. Moreover, a visual target may be stationary relative to the vehicle (e.g., a gauge or display element within the cockpit of an aircraft) or moving relative to the vehicle (e.g., a neighboring vehicle or a ground-based object such as a building, a mountain, or an airport). Thus, the subsystem 106 may be suitably configured to receive, calculate, or process real-time positioning data that indicates the location of the visual target using a known reference coordinate system. For example, the subsystem 106 may report the position of the visual target using GPS coordinates.

For known objects located in fixed positions onboard the vehicle (such as instruments, display elements, control devices, indicator lights, and buttons), the visual target monitor and/or tracking subsystem 106 may store or access a database of position data that indicates the location of various items relative to a known head or eye position of the occupant 102. The known position data of such fixed objects can be used in the manner described in more detail below to calculate desired line-of-sight vectors from the occupant 102 to the fixed objects.

For moving objects located outside the vehicle, the visual target monitor and/or tracking subsystem 106 may cooperate with one or more other onboard subsystems or external subsystems to receive the position data of visual targets in the exterior viewspace. The received or calculated position data of moving objects can be used in the manner described in more detail below to calculate desired line-of-sight vectors from the occupant 102 to the moving targets of interest. For example, the subsystem 106 may cooperate and communicate with an air traffic control datalink system to receive and process information received from ground based air traffic control stations and equipment. In this context, the received information may include position data corresponding to neighboring aircraft in the vicinity of the host aircraft. As another example, the subsystem 106 may cooperate and communicate with a terrain avoidance and warning system (TAWS) that supplies data representative of the location of terrain that may be a potential threat to the aircraft. As yet another example, the subsystem 106 may cooperate and communicate with a traffic and collision avoidance system (TCAS) that provides data associated with other aircraft in the vicinity, which may include speed, direction, altitude, and other status data. Moreover, the subsystem 106 may cooperate and communicate with an Automatic Dependent Surveillance Broadcast (ADS-B) system that receives positioning and status information directly from neighboring aircraft.

For stationary objects located outside the vehicle, the visual target monitor and/or tracking subsystem 106 may cooperate with one or more other onboard subsystems or external subsystems to receive navigation data, mapping data, GPS data, and/or other information that corresponds to the location of the stationary objects. For example, the subsystem 106 may include or access a database populated with known GPS coordinates of known waypoints, points of interest, airports, landmarks, cities, bodies of water, and the like. The known position data of stationary objects outside the vehicle can be used in the manner described in more detail below to calculate desired line-of-sight vectors from the occupant 102 to the stationary objects.

The line-of-sight vector calculation and analysis module 108 may be implemented as a logical processing module that carries out the necessary processing tasks in response to the execution of suitably written computer-executable software instructions. In this regard, the module 108 may be realized using software, firmware, processing logic, or any combination thereof. The module 108 cooperates with the eye and/or head tracking subsystem 104 and the visual target monitor and/or tracking subsystem 106 as needed to obtain the information used to calculate and analyze the line-of-sight vectors in real-time. The information received or accessed by the module 108 may include sensor data collected by the eye and/or head tracking subsystem 104, location or positioning data provided by the visual target monitor and/or tracking subsystem 106, known location or positioning data (which may be preloaded into the system 100) corresponding to stationary objects inside the host vehicle, and/or other types of data that may be needed to support the visual assistance techniques and methodologies presented here.

The line-of-sight vector calculation and analysis module 108 is suitably configured to determine whether or not the observer is gazing at the intended or desired visual target, based on the current line-of-sight vector that represents the actual gaze direction of the observer, and further based on the current line-of-sight vector that represents the desired gaze direction from the observer to the visual target of interest. If the system 100 determines that the observer is likely to be looking at the visual target of interest, then little to no action need be taken. In contrast, if the system 100 determines that the observer is gazing in the wrong direction (i.e., is not looking at the visual target), then at least one type of notification may be generated.

Figure 2:
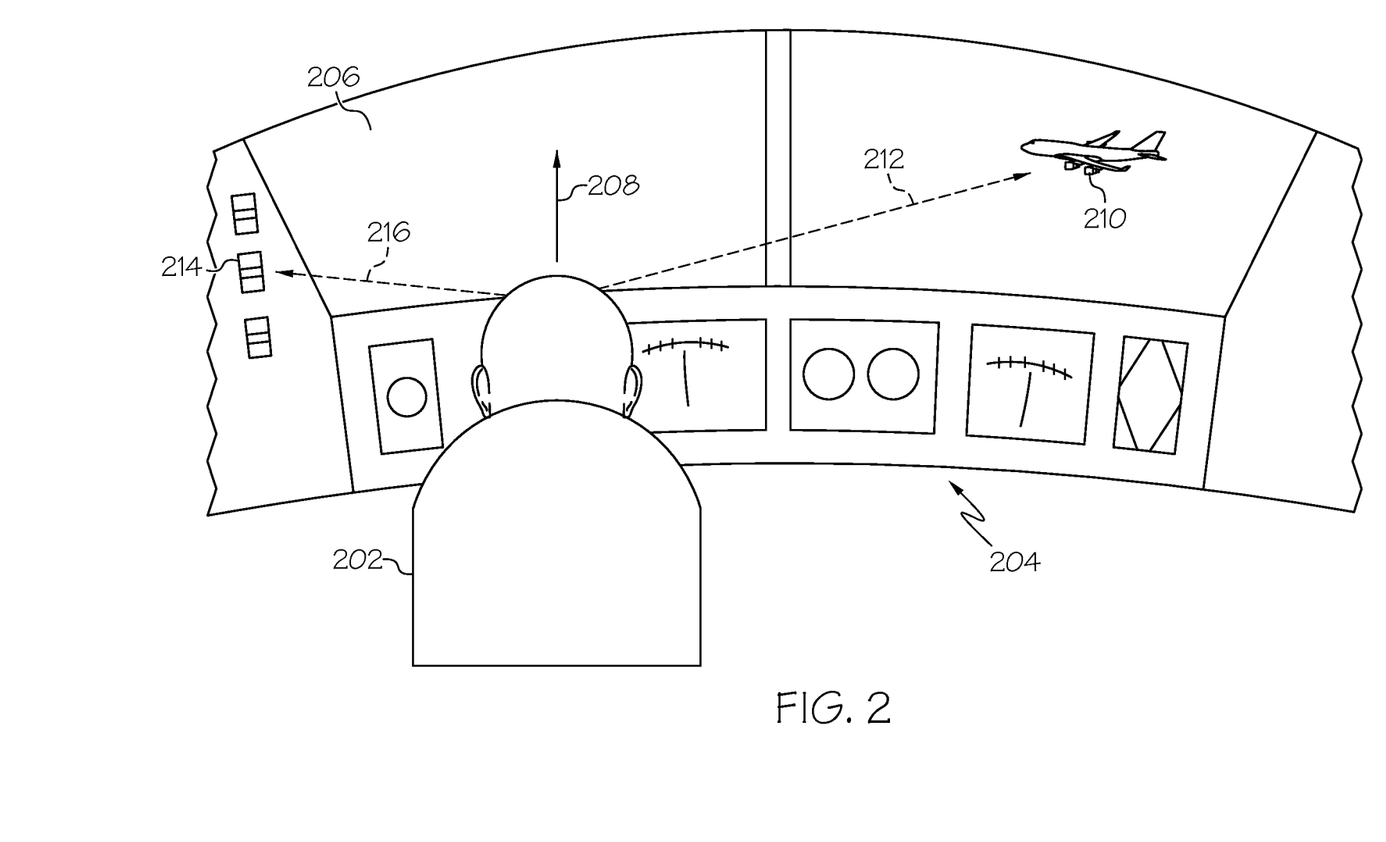
FIG. 2 is a diagram that depicts an in-flight scenario where the pilot of an aircraft needs assistance to direct his gaze toward a visual target of interest.

FIG. 2 is a diagram that depicts an in-flight scenario where the pilot 202 of an aircraft needs assistance to direct his gaze toward a visual target of interest. FIG. 2 is a simplified rendition of the inside of the aircraft cockpit 204, which includes a number of display elements, instrumentation, controls, etc. FIG. 2 corresponds to an in-flight scenario during which the pilot 202 is currently looking straight out of the window 206 of the aircraft. Accordingly, the current and actual line-of-sight vector 208 for the pilot 202 is generally directed toward the airspace immediately in front of the pilot 202.

FIG. 2 also depicts a neighboring aircraft 210 in flight within the visible airspace near the host aircraft. If the neighboring aircraft 210 is considered to be the visual target of interest, then the current view state of the pilot 202 should be corrected such that his actual gaze direction is toward the neighboring aircraft 210 rather than directly in front of him. In this regard, the difference between the actual line-of-sight vector 208 of the pilot 202 and the desired line-of sight vector 212 from the pilot 202 to the neighboring aircraft 210 is large enough to cause the system 100 to generate a visual guidance notification for the pilot 202. FIG. 2 also illustrates how an item inside the cockpit, such as a control switch 214, may be the designated visual target of interest. Here, the difference between the actual the actual line-of-sight vector 208 of the pilot 202 and the desired line-of sight vector 216 from the pilot 202 to the control switch 214 may also be large enough to cause the system 100 to generate a visual guidance notification for the pilot 202.

Referring again to FIG. 1, the system 100 may generate any type of notification, as appropriate to the particular embodiment, intended application, current operating environment and status, and the like. The notification provides guidance or assistance to redirect the current gaze direction of the occupant toward the visual target of interest. The system 100 may accomplish this goal in any number of different ways. For example, the system 100 may include or cooperate with the display subsystem 110 to generate and render visual notifications including, without limitation: alphanumeric messages; icons; directional indicators such as arrows or chevrons; images; videos; animations; warning or alert indicators such as flashing lights or graphical representations of flashing lights; or the like. Additionally or alternatively, the system 100 may include or cooperate with the audio subsystem 112 to generate and emit audible notifications including, without limitation: recorded or synthesized voice instructions; audio tones emitted from a location or locations that are intended to direct the observer's attention toward the sound source; warning or alert tones; or the like. Additionally or alternatively, the system 100 may include or cooperate with the haptic feedback subsystem 114 to produce and initiate haptic feedback that is intended for the observer. The haptic feedback may include, without limitation: vibrations or "knocks" transmitted to a yoke, joystick, steering wheel, shift knob, or other handheld element typically found within the cabin or cockpit of the vehicle; vibrations or "knocks" transmitted to headgear, eyewear, or other equipment worn by the observer; vibrations or "knocks" transmitted to the occupant's seat; vibrations or "knocks" transmitted to the floor; the actuation or activation of dynamic or mechanical elements that can be felt by the observer; etc. In practice, the haptic feedback is intelligently generated in a way that conveys or otherwise indicates a viewspace location of the visual target of interest. For example, the right temple of the occupant's eyewear and/or the right side of the occupant's seat may vibrate to indicate that the occupant should look to the right.

Figure 3:
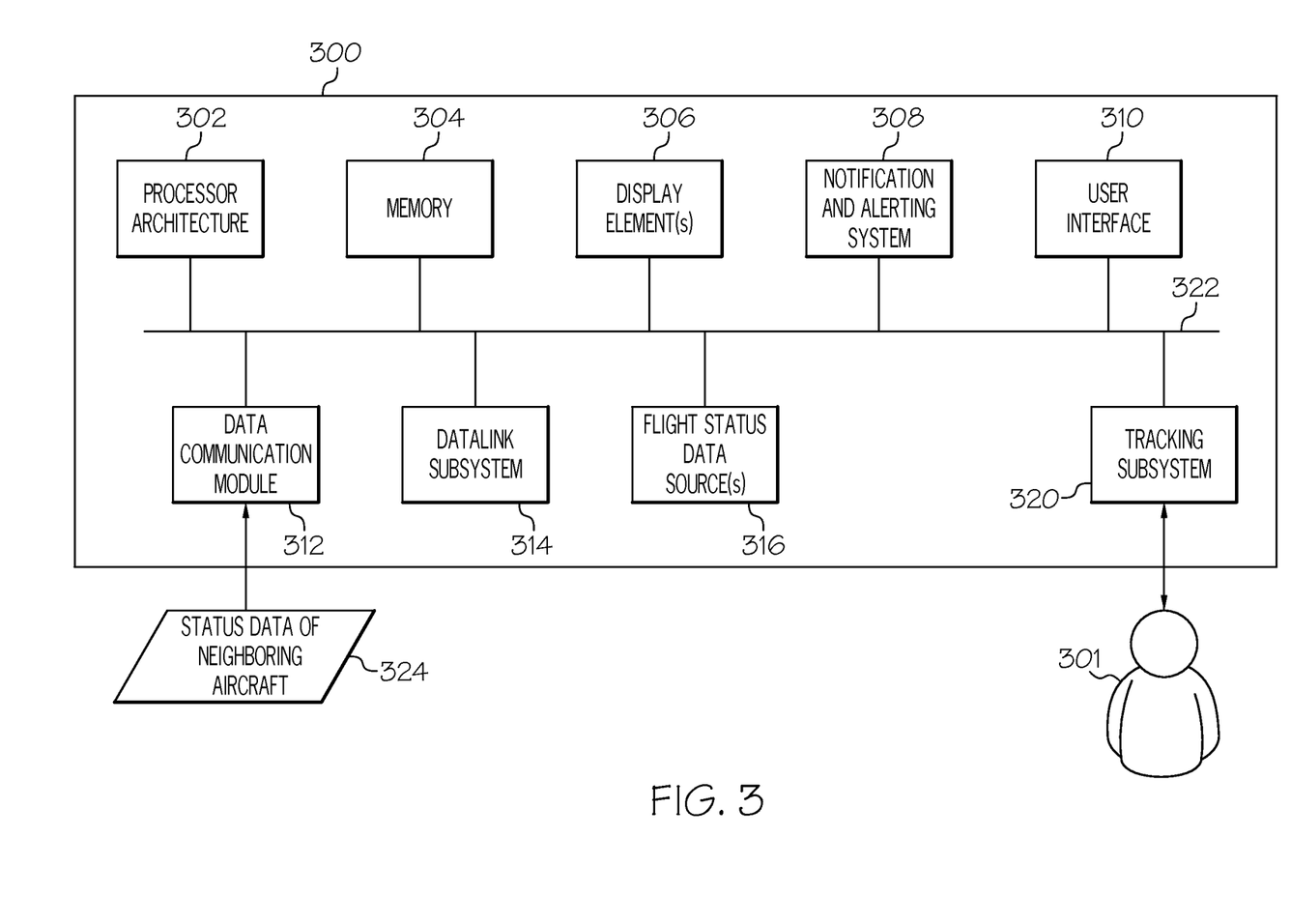
FIG. 3 is a simplified block diagram representation of an exemplary embodiment of an onboard aircraft system that provides visual search assistance to an occupant or operator of the aircraft.

As mentioned above with reference to FIG. 1, the system 100 is preferably deployed onboard the host vehicle. In an aircraft implementation, the system 100 may cooperate with or be implemented as a flight deck computing system. In this regard, FIG. 3 is a simplified representation of an exemplary embodiment of an onboard aircraft computing system 300 that provides visual search assistance to an occupant 301 of the aircraft. In exemplary embodiments, the system 300 is located onboard the host aircraft, i.e., the various components and elements of the system 300 reside within the host aircraft, are carried by the host aircraft, or are attached to the host aircraft. The illustrated embodiment of the system 300 includes, without limitation: a processor architecture 302 having at least one processor device; an appropriate amount of memory 304; at least one display element 306; a notification and alerting subsystem 308; a user interface 310; a data communication module 312; a datalink subsystem 314; at least one source of flight status data 316; and a tracking subsystem 320. These elements of the system 300 may be coupled together by a suitable interconnection architecture 322 that accommodates data communication, the transmission of control or command signals, and/or the delivery of operating power within the system 300. It should be understood that FIG. 3 is a simplified representation of the computing system 300 that will be used for purposes of explanation and ease of description, and that FIG. 3 is not intended to limit the application or scope of the subject matter in any way. In practice, the system 300 and the host aircraft will include other devices and components for providing conventional and traditional functions and features. Furthermore, although FIG. 3 depicts the system 300 as a single unit, the individual elements and components of the system 300 could be implemented in a distributed manner using any number of physically distinct pieces of hardware or equipment.

The processor architecture 302 may be implemented or realized with any number of discrete processor devices, content addressable memory, digital signal processors, application specific integrated circuits, field programmable gate arrays, any suitable programmable logic device, discrete gate or transistor logic, discrete hardware components, or any combination designed to perform the functions described here. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration. The processor architecture is capable of executing computer-executable instructions that cause the system 300 to perform the various techniques, operations, and functions related to the provision of visual guidance assistance.

The memory 304 may be realized as RAM memory, flash memory, EPROM memory, EEPROM memory, registers, a hard disk, a removable disk, a CD-ROM, or any other form of storage medium known in the art. In this regard, the memory 304 can be coupled to the processor architecture 302 such that the processor architecture 302 can read information from, and write information to, the memory 304. In the alternative, the memory 304 may be integral to the processor architecture 302. As an example, the processor architecture 302 and the memory 304 may reside in an ASIC. In practice, a functional or logical module/component of the computing system 300 might be realized using program code that is maintained in the memory 304. For example, the notification and alerting subsystem 308, the data communication module 312, the datalink subsystem 314, and/or the tracking subsystem 320 may have associated software program components that are stored in the memory 304. Moreover, the memory 304 can be used to store data utilized to support the operation of the system 300, as will become apparent from the following description.

In an exemplary embodiment, display elements 306 may be driven by a suitably configured graphics processor or graphics processing system (not shown). In this manner, the display elements 306 can be used to display, render, or otherwise convey one or more graphical representations, synthetic displays, graphical icons, visual symbology, textual messages, or images associated with operation of the host aircraft and, in particular, the presentation of visual guidance notifications as described in greater detail below.

The computing system 300 also includes or cooperates with the notification and alerting subsystem 308. For this embodiment, notification and alerting subsystem 308 may be responsible for the generation and presentation of audio, visual, haptic, and/or other types of feedback intended to help focus the occupant of the vehicle on a desired visual target. The notification and alerting subsystem 308 may also be responsible for the generation and presentation of other alerts, alarms, messages, and notifications associated with conventional and routine operations of the host vehicle.

The illustrated embodiment of the computing system 300 includes a user interface 310, which is suitably configured to receive input from a user (e.g., a pilot, an operator, a crew member, or any occupant of the vehicle) and, in response to the user input, supply appropriate command signals to the system 300. The user interface 310 may be any one, or any combination, of various known user interface devices or technologies, including, but not limited to: a cursor control device such as a mouse, a trackball, or joystick; a keyboard; buttons; switches; or knobs. Moreover, the user interface 310 may cooperate with one or more of the display elements 306 to provide a graphical user interface.

In certain exemplary embodiments, the data communication module 312 is suitably configured to support data communication between the host aircraft and one or more remote systems. More specifically, the data communication module 312 is used to receive current status data 324 of other aircraft that are near the host aircraft. In particular embodiments, the data communication module 312 is implemented as an aircraft-to-aircraft data communication module that receives flight status data and GPS data from an aircraft other than the host aircraft. For example, the data communication module 312 may be configured for compatibility with Automatic Dependent Surveillance-Broadcast (ADS-B) technology, with Traffic and Collision Avoidance System (TCAS) technology, and/or with similar technologies.

The status data 324 may include, without limitation: airspeed data; groundspeed data; altitude data; attitude data, including pitch data and roll data; yaw data; geographic position data, such as GPS data; time/date information; heading information; weather information; flight path data; track data; radar altitude data; geometric altitude data; wind speed data; wind direction data; etc. The computing system 300 is suitably designed to process the received status data 324 as needed and appropriate to determine a real-time eye gaze vector from the observer to the desired visual target of interest, e.g., a neighboring aircraft.

The datalink subsystem 314 enables the host aircraft to communicate with Air Traffic Control (ATC). In this regard, the datalink subsystem 314 may be used to provide ATC data to the host aircraft and/or to send information from the host aircraft to ATC, preferably in compliance with known standards and specifications. In addition to conventional and traditional uses, the system 300 may use the datalink subsystem 314 to obtain status and positioning data of neighboring aircraft (via ATC personnel or equipment) and/or positioning data of other visual targets in the vicinity of the host aircraft.

In operation, the computing system 300 is also configured to process the current flight status data for the host aircraft. In this regard, the sources of flight status data 316 generate, measure, and/or provide different types of data related to the operational status of the host aircraft, the environment in which the host aircraft is operating, flight parameters, and the like. In practice, the sources of flight status data 316 may be realized using line replaceable units (LRUs), transducers, accelerometers, instruments, sensors, and other well-known devices. The data provided by the sources of flight status data 316 may include, without limitation: airspeed data; groundspeed data; altitude data; attitude data, including pitch data and roll data; yaw data; geographic position data, such as GPS data; time/date information; heading information; weather information; flight path data; track data; radar altitude data; geometric altitude data; wind speed data; wind direction data; etc. The computing system 300 is suitably designed to process data obtained from the sources of flight status data 316 in the manner described in more detail herein. In addition to conventional and typical processing, the system 300 may leverage the flight status data of the host aircraft to calculate line-of-sight vectors from the observer to visual targets.

The tracking subsystem 320 corresponds to that described above with reference to FIG. 1. More specifically, the tracking subsystem 320 represents the hardware, software, firmware, and/or processing logic that is responsible for monitoring and tracking (in real-time) the observer's eye gaze, head position or orientation, etc. The functionality of the tracking subsystem 320 was described above with reference to the eye and/or head tracking subsystem 104.

Figure 4:
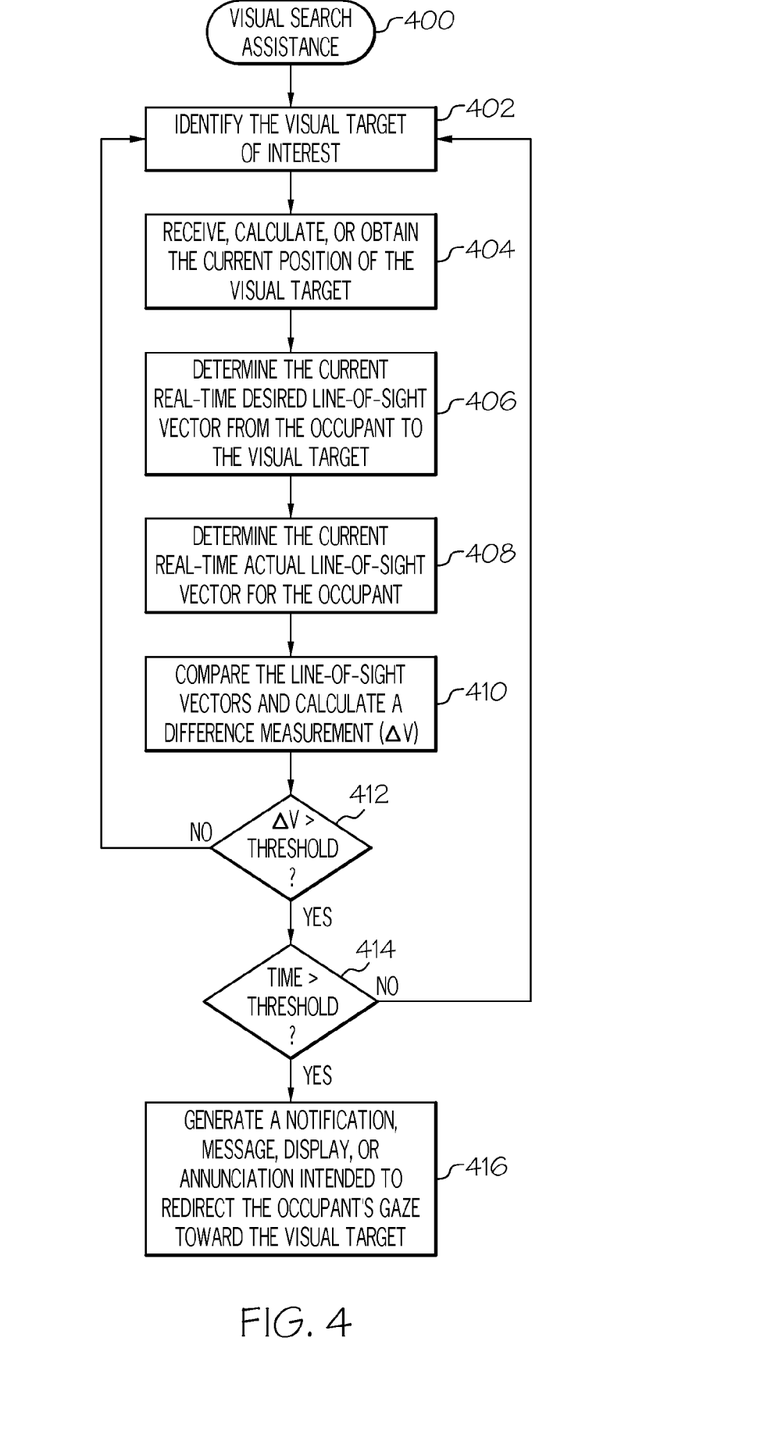
FIG. 4 is a flow chart that illustrates an exemplary embodiment of a visual search assistance process.

FIG. 4 is a flow chart that illustrates an exemplary embodiment of a visual search assistance process 400, which may be performed by the systems 100, 300 described above. The various tasks performed in connection with the process 400 may be performed by software, hardware, firmware, or any combination thereof. For illustrative purposes, the following description of the process 400 may refer to elements mentioned above in connection with FIGS. 1-3. In practice, portions of the process 400 be performed by different elements of the described system, e.g., a tracking subsystem, a display subsystem, a data communication module, or the like. It should be appreciated that the process 400 may include any number of additional or alternative tasks, the tasks shown in FIG. 4 need not be performed in the illustrated order, and the process 400 may be incorporated into a more comprehensive procedure or process having additional functionality not described in detail herein. Moreover, one or more of the tasks shown in FIG. 4 could be omitted from an embodiment of the process 400 as long as the intended overall functionality remains intact.

The process 400 may be initiated automatically based on the detection of certain operating conditions, alert conditions, or the like. Alternatively (or additionally), the process 400 may be initiated by a user of the system, either manually or by a voice command. For example, the process 400 might be triggered by a voice response system that detects a pilot query such as "Where is airport YYZ?" or "Where is the circuit panel breaker?" or "Please locate the aircraft N123AB?" Such triggering mechanisms are desirable in situations where visual targets outside the host aircraft are not visible or are obscured from view.

The process 400 is preferably performed in an ongoing manner continuously in accordance with the desired sampling rate of the host system. For example, an iteration of the process 400 could be performed once every 20 milliseconds (or at any desired rate). Executing the process 400 in this dynamic manner is desirable to update the visual assistance system in real-time or substantially real-time for practical purposes. The illustrated embodiment of the process 400 begins by identifying or otherwise obtaining the visual target of interest (task 402). For example, task 402 may identify a neighboring aircraft as the visual target, based on proximity to the host aircraft. As another example, an onboard alerting or diagnostic subsystem may cooperate with the process 400 as needed to identify a visual target inside the cockpit that might require visual attention (e.g., an alert message, an indicator light, a display screen, or the like). The particular visual target that is identified at task 402, and the manner in which the process 400 identifies the visual target, may vary from one embodiment to another, from one operating environment to another, and from vehicle to vehicle.

The process 400 also receives, calculates, or otherwise obtains the current position/location of the visual target of interest (task 404). In accordance with certain embodiments, task 404 leverages GPS technology to obtain position data corresponding to the visual target. The raw GPS coordinates may be broadcast from the visual target, provided by a terrestrial station (e.g., an ATC station), or the like. The position of the visual target is utilized to dynamically determine the desired line-of-sight vector from an occupant (observer) of the vehicle to the visual target (task 406). In practice, task 406 may process or determine a reference endpoint for the desired line-of-sight vector, where the endpoint corresponds to the position of the observer's eyes, face, or head. The reference endpoint may be an estimated or assumed position that represents a typical or average eye position of a pilot or driver of the vehicle, or it may be a calculated or calibrated position that is determined for each individual, perhaps at the beginning of a flight, drive, or mission. In certain embodiments, a precise reference endpoint may be obtained using the onboard eye gaze tracking subsystem, using sensors associated with an NTE display system, or the like. In such embodiments, the reference endpoint can be continuously tracked in real-time (or substantially real time as needed) by the tracking subsystem.

If the visual target is a stationary object that resides within the vehicle, then the desired line-of-sight vector can be dynamically determined based on a known position or location of the visual target relative to the occupant, relative to a reference location such as the pilot's or driver's seat, relative to a calibrated head or eye position of the occupant, or the like. In certain preferred embodiments, the reference location corresponds to the current eye position as determined in real-time (or substantially real time) by the tracking subsystem. If the visual target is a stationary ground-based target that resides outside the vehicle, then the desired line-of-sight vector can be dynamically determined based on a known geographical position of the visual target, such as its GPS coordinates. If the visual target is a moving object that resides outside the vehicle, then the desired line-of-sight vector can be dynamically determined based on real-time position data of the visual target, which may be received at task 404.

The process 400 may continue by dynamically determining the actual line-of-sight vector for the occupant (observer) of the vehicle (task 408). Task 408 calculates or obtains the current and real-time gaze direction of the occupant using the appropriate onboard tracking system of the vehicle, as explained above. Accordingly, the actual line-of-sight vector may be determined based on a current eye gaze direction of the occupant, as detected by an onboard eye gaze tracking system. Alternatively or additionally, the actual line-of-sight vector may be determined based on a current head position or orientation of the occupant, as detected by an onboard head tracking system. As yet another example, the actual line-of-sight vector may be determined based on a current eye gaze direction of the occupant, as detected by an onboard NTE display system (e.g., smart eyewear or a head-worn HUD system). Notably, the desired line-of-sight vector determined at task 406 is temporally associated or correlated with the actual line-of-sight vector determined at task 408. In other words, the timing of the two vectors is the same.

The two obtained line-of-sight vectors are compared against each other to obtain an appropriate difference measurement (task 410). In practice, the vectors may need to be rotated, translated, or otherwise processed to facilitate the comparison. For example, the vectors may need to be rotated in accordance with a known reference frame to obtain an intelligible and relevant difference measurement. In layman's terms, the difference measurement indicates the extent by which the observer's eye gaze is diverted from the intended and desired visual target. Thus, if the observer is looking at or near the visual target, then the difference measurement will be relatively low. In contrast, if the observer is looking far away from the visual target, then the difference measurement will be relatively high. Depending on the embodiment, the difference measurement may be a scalar quantity or a vector quantity, or it could be expressed in any suitable manner.

The process 400 may continue by checking whether the difference measurement exceeds a threshold value (query task 412). The threshold is selected to reduce false alerts and nuisance messages, while still preserving the desired functionality. If the difference measurement does not exceed the threshold value (the "No" branch of query task 412), then the process 400 may exit or return to task 402 to initiate the next processing iteration. If, however, the difference measurement exceeds the threshold value (the "Yes" branch of query task 412), then the process 400 continues by considering whether a notification is needed.

Although not always required, the embodiment described here checks whether the occupant's attention has been diverted for a sufficiently long period of time. For example, if a pilot's eyes are darting around the cockpit for a brief period of time before settling on the desired visual target, then it may not be necessary to generate a notification to guide the pilot to the visual target. On the other hand, if the pilot has been looking away from the visual target for more than several seconds, then it may be appropriate to generate an alert or an audible message in an attempt to redirect the pilot's gaze. Accordingly, the process 400 may check whether a current value of a running timer exceeds a time threshold (query task 414). In this regard, the timer may be initialized as soon as the difference measurement exceeds the threshold value (see query task 412). The time threshold is selected to reduce false alerts and nuisance messages, while still preserving the desired functionality.

If the current timer value is less than or equal to the time threshold (the "No" branch of query task 414), then the process 400 may return to task 402 to initiate the next processing iteration while still tracking the same visual target. If, however, the timer value exceeds the time threshold (the "Yes" branch of query task 414), then the process 400 continues by generating an appropriately formatted notification, message, display, feedback, or annunciation (task 416). Regardless of the format and chosen delivery method, the notification provides guidance to redirect the gaze direction of the occupant toward the visual target of interest. As mentioned previously with reference to FIG. 1, different types of notifications may be available to the process 400. For instance, the notification produced at task 416 may be an audible instruction that is emitted to inform the occupant of the vehicle of a viewspace location of the visual target. In this regard, the onboard audio system may be used to announce a message such as: "LOOK TO YOUR LEFT" or "AIRCRAFT APPROACHING FROM ABOVE" or "THE ALERT IS COMING FROM THE MAIN CONTROL PANEL—LOOK FURTHER LEFT AND SLIGHTLY DOWN". As another example, the notification may be generated in the form of a directional indicator, arrow, or icon that is graphically displayed for the occupant and is formatted or otherwise designed to point toward the viewspace location of the visual target. In practice, a directional indicator could be displayed on a primary display element, on a HUD system, on a NTE display system, or the like. Alternatively or additionally, the notification may take the form of a textual message that describes, identifies, or indicates the viewspace location of the visual target. In this regard, the audio messages provided as examples above could be displayed as alphanumeric messages on one or more display elements or systems. As yet another example, the notification could take the form of haptic feedback intended for the observer, wherein the haptic feedback provides some type of physical stimulation that is intended to indicate the viewspace location of the visual target of interest.

As mentioned above, the process 400 can be repeated in an ongoing manner to continuously track the eye gaze direction of the observer, continuously track the position of the visual target (if necessary), and continuously update the line-of-sight vectors in real-time or approximately real-time. Thus, task 416 will lead back to task 402 if it is time to perform another iteration of the process 400. Frequent updating of the line-of-sight vectors is desirable to keep the occupant well informed during operation of the vehicle.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A visual search assistance method for an occupant of a vehicle having a window, the method comprising:
providing an onboard computing system that includes an onboard tracking system and a transparent display, wherein the transparent display is a head mounted display configured to be mounted on a head of the occupant, the transparent display configured to allow the occupant to view a visual target that is outside the vehicle through both the window and the transparent display;
dynamically determining a desired line-of-sight vector from the occupant of the vehicle to the visual target;
dynamically determining, with the onboard tracking system, an actual line-of-sight vector for the occupant of the vehicle, the determined actual line-of-sight vector being temporally associated with the determined desired line-of-sight vector;
comparing the determined actual line-of-sight vector against the determined desired line-of-sight vector to obtain a difference measurement;
when the obtained difference measurement exceeds a threshold value, checking a current value of a running timer that indicates how long the occupant has been looking away from the visual target;
generating, by the onboard computing system, a notification signal based on input from the onboard tracking system when the obtained difference measurement exceeds the threshold value and the current value of the running timer exceeds a time threshold value;
communicating the notification signal to the transparent display; and
displaying a notification on the transparent display, the notification based on the notification signal, the notification providing guidance to redirect a gaze direction of the occupant through the transparent display and the window toward the visual target, the notification including a directional indicator on the transparent display, the direction indicator pointing toward a viewspace location of the visual target to redirect the gaze direction of the occupant.

2. The method of claim 1,
wherein the visual target is an outside visual target that is outside the vehicle; and wherein the transparent display is further configured to allow the occupant to view, through the transparent display, an onboard visual target that is onboard the vehicle; and wherein displaying the notification includes displaying a first notification; and further comprising dynamically determining, with the onboard tracking system, a desired line-of-sight vector from the occupant to the onboard visual target based on a known position of the onboard visual target relative to the occupant; and further comprising displaying a second notification on the transparent display, the second notification providing guidance to redirect the gaze direction of the occupant through the transparent display toward the onboard visual target.

3. The method of claim 1, wherein:
the visual target is a stationary ground-based target that resides outside the vehicle; and
the desired line-of-sight vector is dynamically determined based on a known geographical position of the visual target.

4. The method of claim 1, wherein:
the visual target is a moving object that resides outside the vehicle;
the method further comprises receiving, with the onboard computing system, real-time position data of the visual target; and
the desired line-of-sight vector is dynamically determined based on the received real-time position data of the visual target.

5. The method of claim 1, wherein:
the onboard tracking system comprises an eye gaze tracking system; and
the actual line-of-sight vector is dynamically determined based on a current eye gaze direction of the occupant, as detected by the eye gaze tracking system.

6. The method of claim 1, wherein:
the onboard tracking system comprises a head tracking system; and
the actual line-of-sight vector is dynamically determined based on a current head position of the occupant, as detected by the head tracking system.

7. The method of claim 1, wherein:
the onboard tracking system and the transparent display are comprised by a near-to-eye display system; and
the actual line-of-sight vector is dynamically determined based on a current eye gaze direction of the occupant, as detected by the near-to-eye display system.

8. The method of claim 1, further comprising:
emitting an audible instruction to inform the occupant of a viewspace location of the visual target.

9. The method of claim 1, further comprising:
displaying a textual message on the transparent display, the textual message describing, identifying, or indicating a viewspace location of the visual target.

10. The method of claim 1, further comprising:
producing haptic feedback intended for the occupant of the vehicle, the haptic feedback indicating a viewspace location of the visual target.

11. A tangible and non-transitory computer readable medium having computer-executable instructions stored thereon and capable of performing a method when executed by a processor, the method comprising:
dynamically obtaining a desired line-of-sight vector from an occupant of an aircraft having a window to a visual target outside the aircraft;

dynamically obtaining, from an onboard tracking system of the aircraft, an actual line-of-sight vector for the occupant of the aircraft, the determined actual line-of-sight vector being temporally associated with the determined desired line-of-sight vector;

comparing the determined actual line-of-sight vector against the determined desired line-of-sight vector to obtain a difference measurement;

when the obtained difference measurement exceeds a threshold value, checking a current value of a running timer that indicates how long the occupant has been looking away from the visual target;

generating a notification signal based on input from the onboard tracking system when the obtained difference measurement exceeds the threshold value and the current value of the running timer exceeds a time threshold value;

communicating the notification signal to a transparent display that is configured to be mounted on a head of the occupant; and displaying a notification on the transparent display, the notification based on the notification signal, the notification providing guidance to redirect a gaze direction of the occupant through the transparent display and the window toward the visual target, the notification including a directional indicator on the transparent display, the direction indicator pointing toward a viewspace location of the visual target to redirect the gaze direction of the occupant.

12. The computer readable medium of claim 11, wherein:
the onboard tracking system comprises an eye gaze tracking system; and
the actual line-of-sight vector is dynamically determined based on a current eye gaze direction of the occupant, as detected by the eye gaze tracking system.

13. The computer readable medium of claim 11, wherein:
the onboard tracking system comprises a head tracking system; and
the actual line-of-sight vector is dynamically determined based on a current head position of the occupant, as detected by the head tracking system.

14. The computer readable medium of claim 11, wherein:
the onboard tracking system and the transparent display are comprised by a near-to-eye display system; and
the actual line-of-sight vector is dynamically determined based on a current eye gaze direction of the occupant, as detected by the near-to-eye display system.

15. The computer readable medium of claim 11, further comprising:
emitting an audible instruction to inform the occupant of a viewspace location of the visual target.

16. The computer readable medium of claim 11, wherein the transparent display is included on a near-to-eye display system.

17. A computing system for a vehicle with a window, the computing system comprising a processor architecture having at least one processor device, and comprising memory having computer-executable instructions stored thereon that, when executed by the processor architecture, cause the computing system to:
operate an onboard tracking system of the vehicle to dynamically obtain a current line-of-sight vector for an occupant of the vehicle;
compare the obtained current line-of-sight vector against a current desired line-of-sight vector from the occupant of the vehicle to a visual target outside the vehicle, the obtained current line-of-sight vector being temporally associated with the current desired line-of-sight vector;

when the obtained difference measurement exceeds a threshold value, check a current value of a running timer that indicates how long the occupant has been looking away from the visual target;

generate a display signal based on input from the onboard tracking system when the obtained difference measurement exceeds the threshold value and when the current value of the running timer exceeds a time threshold value; and display information on a transparent display based on the display signal, the transparent display being a head-mounted display configured to be mounted on a head of the occupant, the information intended for the occupant of the vehicle, and the information providing guidance to redirect a gaze direction of the occupant through the transparent display and through the window toward the visual target, the notification including a directional indicator on the transparent display, the direction indicator pointing toward a viewspace location of the visual target to redirect the gaze direction of the occupant.

18. The computing system of claim 17, further comprising providing an audible instruction that directs the occupant to a viewspace location of the visual target.

* * * * *